United States Patent [19]
Warnke et al.

[11] Patent Number: 6,035,533
[45] Date of Patent: Mar. 14, 2000

[54] APPARATUS AND METHOD FOR INSTALLING AND REMOVING A BEARING CUP ON A UNIVERSAL JOINT

[75] Inventors: James W. Warnke; Daniel E. Beitzel, both of Toledo, Ohio

[73] Assignee: Dana Corporation, Toledo, Ohio

[21] Appl. No.: 09/303,141

[22] Filed: Apr. 30, 1999

Related U.S. Application Data

[60] Provisional application No. 60/083,634, Apr. 30, 1998.

[51] Int. Cl.$^7$ ............... F16D 1/00; B23P 11/00
[52] U.S. Cl. ................... 29/898.07; 29/898.08; 29/281.1; 29/467
[58] Field of Search ............ 29/898.07, 898.08, 29/898.09, 464, 467, 559, 271, 281.1, 281.5, 251

[56] References Cited

U.S. PATENT DOCUMENTS

| | | |
|---|---|---|
| 3,237,291 | 3/1966 | Kelso . |
| 3,429,021 | 2/1969 | Spiess . |
| 3,517,433 | 6/1970 | Pitner . |
| 3,786,544 | 1/1974 | Ferguson . |
| 4,558,502 | 12/1985 | Gossmann et al. . |
| 4,977,660 | 12/1990 | Maynard . |

*Primary Examiner*—David P. Bryant
*Assistant Examiner*—Essama Omgba
*Attorney, Agent, or Firm*—MacMillan, Sobanski & Todd, LLC

[57] ABSTRACT

A method for installing or removing a bearing cup on a universal joint with the assistance of a tool is disclosed. The universal joint is of the type having a yoke including a pair of opposed arms which have inner surfaces facing each other. Each of the arms has an opening for receiving a bearing cup. The tool has a pair of contact surfaces which are spaced apart from one another by a distance which is approximately equal to the distance between the inner surfaces of the arms. To install the bearing cup, the tool is positioned between the arms so that the contact surfaces of the tool respectively abut the inner surfaces of the arms. The bearing cup is then pressed into the opening of one of the arms such that the tool prevents the pair of opposed arms from deflecting in a direction towards one another. Preferably, a cross having a pair of opposed trunnions is positioned between the arms so that the bearing cup is mounted on one of the trunnions when the bearing cup is pressed in the opening. A second bearing cup can then be installed in the opening of the other arm. To remove the bearing cups, the tool is positioned between the arms so that the contact surfaces of the tool respectively abut the inner surfaces of the arms. One of the bearing cups is then pressed through the opening of the respective arm, thereby causing movement of the cross which moves the other bearing cup out of the respective opening.

15 Claims, 9 Drawing Sheets

APPARATUS AND METHOD FOR INSTALLING AND REMOVING A BEARING CUP ON A UNIVERSAL JOINT

CROSS REFERENCE TO RELATED APPLICATION

This application claims the benefit of U.S. Provisional Application No. 60/083,634, filed Apr. 30, 1998.

BACKGROUND OF THE INVENTION

This invention relates in general to universal joints and in particular to an apparatus for facilitating the installation and removal of a bearing cup on a trunnion of a cross connected to a yoke of a universal joint.

Universal joints are well known devices that provide a driving connection between two members adapted to rotate about non-aligned axes of rotation. A typical universal joint includes a cross having a central body portion with four cylindrical trunnions extending outwardly therefrom. The trunnions are oriented in a single plane and extend at right angles relative to one another. A hollow cylindrical bearing cup is mounted on the end of each of the trunnions. Needle bearings or similar means are provided between the outer cylindrical surfaces of the trunnions and the inner cylindrical surfaces of the bearing cups to permit relative rotational movement therebetween. The bearing cups mounted on a first opposed pair of the trunnions are connected to a first yoke secured to an end of a first member, while the bearing cups mounted on a second opposed pair of the trunnions are connected to a second yoke secured to an end of a second member.

One type of yoke that is commonly used in connection with universal joints is a full round end yoke. A typical full round end yoke includes a body portion having a pair of opposed arms extending therefrom. The opposed arms extend outwardly from the body portion in a cantilevered manner. A pair of aligned openings are formed through the opposed arms of the full round end yoke. To assemble a universal joint with a full round end yoke, one of the opposed pairs of trunnions is initially positioned within the aligned openings formed through the opposed arms of the full round end yoke. The bearing cups containing the needle bearings are then disposed about the ends of the opposed pair of trunnions by moving the bearing cups inwardly through the opposed openings formed through the opposed arms of the end yoke and onto the associated trunnions. Snap rings or other retainers may then be applied to retain the bearing cups on the associated trunnions.

It is usually desirable that the bearing cups engage the inner surfaces of the associated openings in a press fit relationship. Thus, the amount of force required to move the bearing cups through the openings formed through the opposed arms of the full round end yoke during the installation process is relatively large. To accomplish this, it is known to use a mechanical press to move the bearing cups through the openings formed through the opposed arms of the full round end yoke during the installation process. Typically, one of the opposed arms of the full round end yoke is initially positioned against a fixed reaction surface of the mechanical press so as to provide support. Next, the bearing cup is positioned adjacent to the opening formed through the other of the opposed arms. The mechanical press is then actuated to drive a push rod against the bearing cup, thereby moving the bearing cup through the opening in the opposed arm. The other bearing cup can be installed in a similar manner. The same mechanical press can be used in a similar manner to remove the bearing cups from the trunnions, such as may be desirable when servicing the universal joint.

As mentioned above, the bearing cups usually engage the inner surfaces of the associated openings in a press fit relationship, requiring the exertion of a relatively large amount of force to move the bearing cups through the openings. In conventional yokes that are formed from a relatively strong material, such as steel, the exertion of these forces can be absorbed by the yoke without causing any damage thereto. In newer yokes that are formed from lighter weight materials, such as aluminum, the exertion of these forces can cause flexing of the opposed arms of the yoke during the installation of the bearing cups. Such flexing is undesirable because it can introduce stresses in the opposed arms of the yoke and, in extreme instances permanently deflect such arms. Thus, it would be desirable to provide an apparatus for facilitating the installation and removal of a bearing cup on a trunnion of a cross connected to a yoke of a universal joint that prevents such undesirable deflections.

SUMMARY OF THE INVENTION

This invention relates to an apparatus for facilitating the installation and removal of a bearing cup on a trunnion of a cross connected to a yoke of a universal joint that prevents undesirable deflections of the opposed arms. Each of the arms has an opening for receiving a bearing cup. A tool is used to assist in installing or removing a bearing cup to prevent the arms of the yoke from flexing or deflecting during the installation or removal of the bearing cups. The tool has a pair of contact surfaces which are spaced apart from one another by a distance which is approximately equal to the distance between the inner surfaces of the arms. In one specific embodiment of the invention, the tool is formed by combining two identical tool halves. To install the bearing cup, the tool is positioned between the arms so that the contact surfaces of the tool respectively abut the inner surfaces of the arms. The bearing cup is then pressed into the opening of one of the arms such that the tool prevents the pair of opposed arms from deflecting in a direction towards one another. Preferably, a cross having a pair of opposed trunnions is positioned between the arms so that the bearing cup is mounted on one of the trunnions when the bearing cup is pressed in the opening. A second bearing cup can then be installed in the opening of the other arm. To remove the bearing cups, the tool is positioned between the arms so that the contact surfaces of the tool respectively abut the inner surfaces of the arms. One of the bearing cups is then pressed through the opening of the respective arm, thereby causing movement of the cross which moves the other bearing cup out of the respective opening. The other bearing cup can then be removed by applying a force to the trunnion associated with the removed bearing cup in a direction towards the other arm to move the bearing cup out from the opening of the arm.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
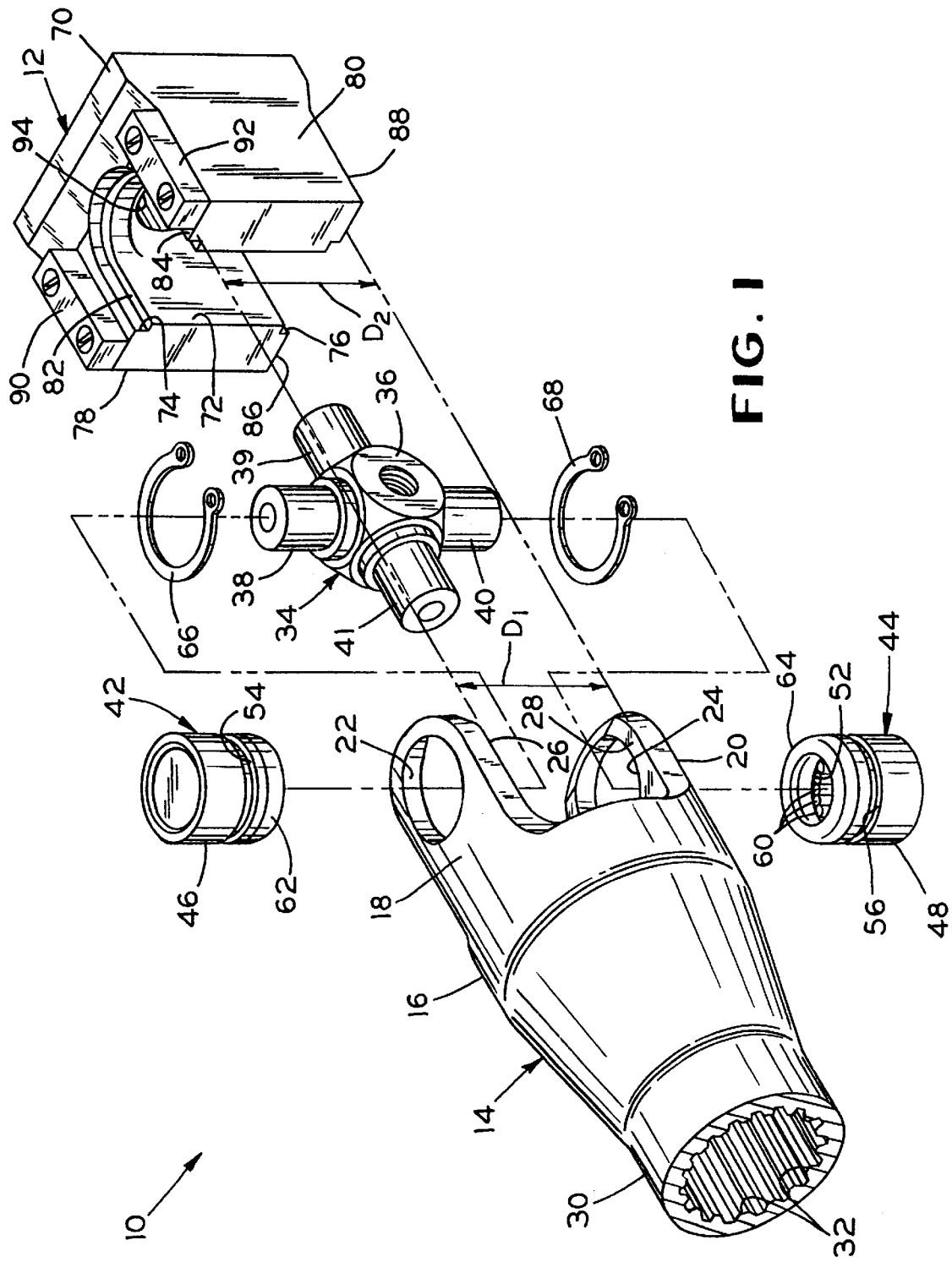
FIG. 1 is an exploded perspective view of a portion of a universal joint and a first embodiment of a tool for installing and removing a bearing cup in accordance with this invention.
Figure 3:
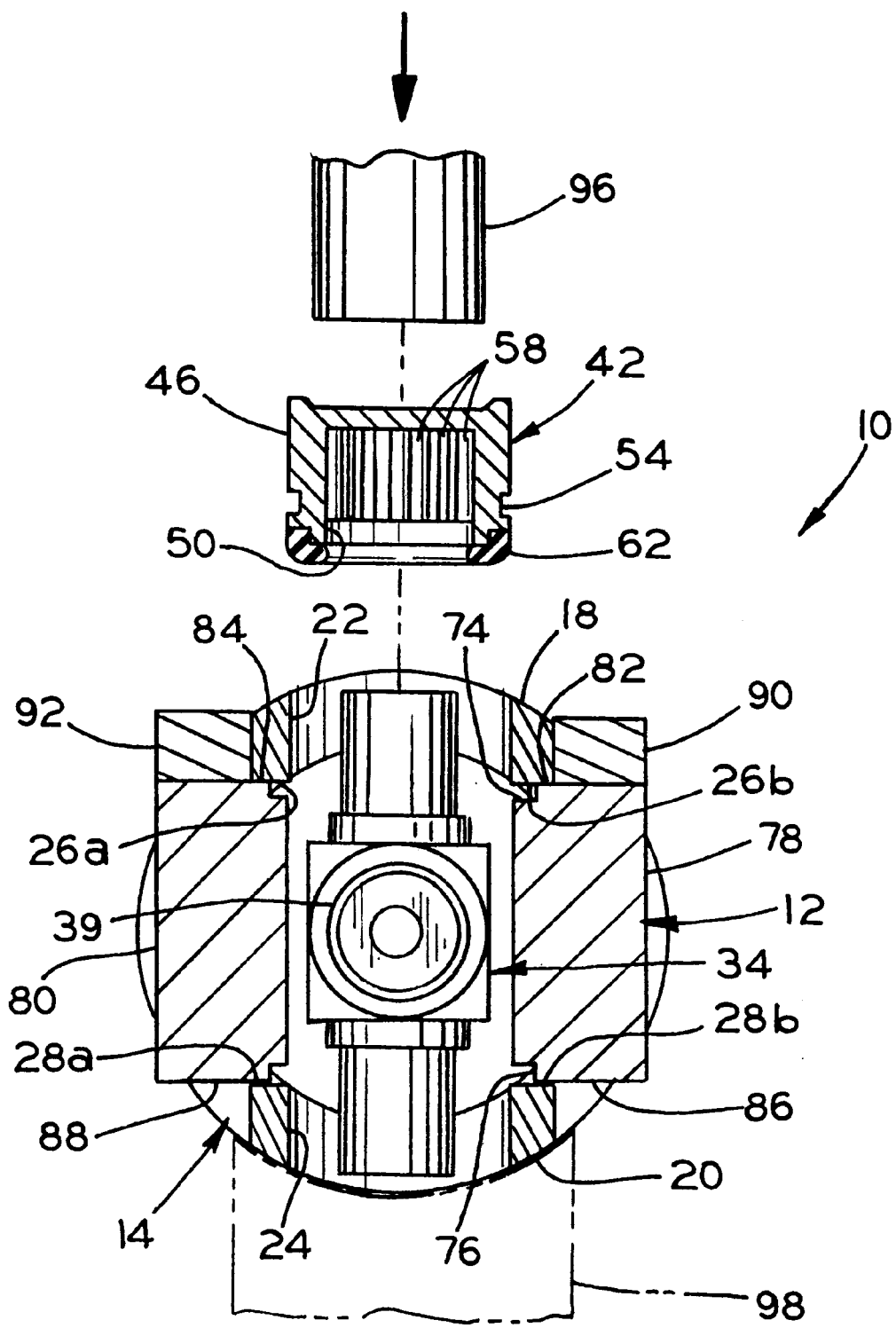
FIG. 3 is a sectional elevational view taken along line 3—3 of FIG. 2.

Referring now to the drawings, there is illustrated in FIG. 1 a portion of a universal joint, indicated generally at 10, and a first embodiment of a tool, indicated generally at 12, for use in assembling and disassembling the universal joint 10, in accordance with this invention. The universal joint 10 includes an end yoke, indicated generally at 14. The end yoke 14 includes a tubular body portion 16 having first and second opposed arms 18 and 20 extending outwardly therefrom in a cantilever manner. The arms 18 and 20 can be formed by removing material from the tubular body portion 16, thereby forming arms 18 and 20 having an arcuate cross-sectional shape. The first arm 18 has a cylindrically-shaped first opening 22 formed therethrough, and the second arm 20 has a cylindrically-shaped second opening 24 formed therethrough. The first and second openings 22 and 24 are co-axially aligned with one another. The first and second arms 18 and 20 each have an inwardly facing inner surface 26 and 28, respectively, through which the respective openings 22 and 24 extend. The inner surfaces 26 and 28 of the first and second arms 18 and 20, respectively, are spaced apart by a distance $D_1$. Due to the openings 22 and 24 and the arcuate cross-sectional shape of the arms 18 and 20, the inner surfaces 26 and 28 have first and second segments 26a and 26b, and 28a and 28b, respectively, as best shown in FIG. 3. The end yoke 14 further includes a central portion 30 extending axially from the body portion 16. The end portion 30 is preferably hollow and cylindrical in shape and may, if desired, be formed having internal splines 32.

The universal joint 10 further includes a cross, indicated generally at 34. The cross 34 includes a central body portion 36 and four cylindrical trunnions 38, 39, 40, 41. The trunnions 38, 39, 40, and 41 extend radially outwardly from the body portion 36. The trunnions 38, 39, 40, and 41 extend in a common plane at right angles to one another. The universal joint 10 further includes first and second bearing cups. indicated generally at 42 and 44, respectively. As will be discussed in detail below, when installed in the universal joint 10, the bearing cups 42 and 44 are mounted about the opposed trunnions 38 and 40, respectively. The bearing cups 42 and 44 are also received in the openings 22 and 24 of the first and second arms 18 and 20, respectively. A second pair of bearing cups (not shown) are mounted about the trunnions 39 and 41 for connection to another end yoke (not shown).

Each of the bearing cups 42 and 44 includes a hollow cylindrical body 46 and 48, respectively, having internal cavities 50 and 52, respectively, formed therein for receiving the associated trunnions 38 and 40. Each of the cylindrical bodies 46 and 48 has an annular groove 54 and 56, respectively, formed in the outer cylindrical surface thereof. Preferably, the bearing cups 42 and 44 have a plurality of needle bearings 58 and 60, respectively, housed within the respective cavities 50 and 52 to permit low friction rotational movement between the first and second bearing cups 42 and 44 and the associated trunnions 38 and 40 of the cross 34. Each of the bearing cups 42 and 44 further includes a seal assembly 62 and 64, respectively, for retaining lubricants surrounding the plurality of needle bearings 46 and 48.

The universal joint 10 further includes a pair of snap rings 66 and 68 that are disposed within the annular grooves 54 and 56 of the bearing cups 42 and 44, respectively, after the bearing cups 42 and 44 have been pressed into the associated cylindrical openings 22 and 24 of the first and second arms 18 and 20. The snap rings 66 and 68 help retain the bearing cups 42 and 44 on the end yoke 14.

Figure 2:
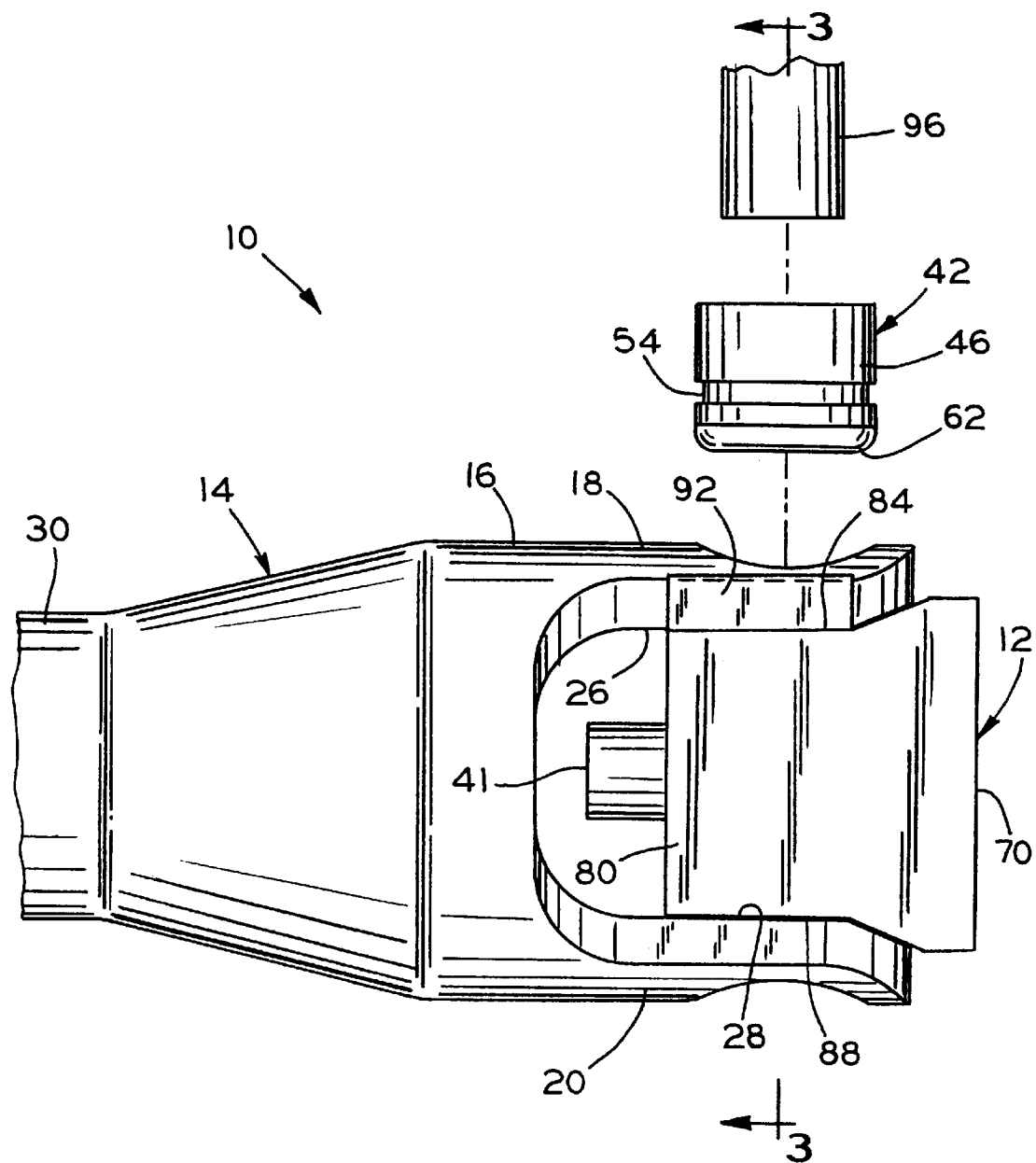
FIG. 2 is a side elevational view of the universal joint illustrated in FIG. 1 showing the tool positioned between the opposed arms of the yoke of the universal joint, prior to insertion of the bearing cup.

As will be discussed in detail below, the tool 12 is positioned between the first and second arms 18 and 20 of the end yoke 14 to assist in the insertion and removal of the bearing cups 42 and 44 from the cylindrical openings 22 and 24. The tool 12 includes a main body 70 having a U-shaped slot 72 formed therethrough to provide clearance for the cross 34. The tool 12 has upper and lower U-shaped grooves 74 and 76 formed therein to provide clearance for the snap rings 66 and 68, respectively. The U-shaped slot 72 defines a pair of side members 78 and 80 extending from the main body 70. Each side member 78 and 80 has an upper contact surface 82 and 84, respectively, and a lower contact surface 86 and 88, respectively, the reason for which will be explained in detail below. The upper contact surfaces 82 and 84 are spaced apart from the associated lower contact surfaces 86 and 88, respectively, by a distance $D_2$. The tool 12 further includes a pair of side rails 90 and 92 that are attached to the tool 12 and extend upwardly from the upper contact surfaces 82 and 84, respectively. The tool 12 also has an opening 94 to provide clearance for the trunnion 39 of the cross 34. To install the first bearing cup 42 in the end yoke 14, the cross 34 is first positioned between the first and second arms 18 and 20 so that the trunnions 38 and 40 are generally co-axial with the openings 22 and 24, such as illustrated in FIGS. 2 and 3. Next, the tool 12 is positioned between the first and second arms 18 and 20. The side rails 90 and 92 assist in aligning the end yoke 14 with the tool 12. The distance between the side rails 90 and 92 is approximately equal to the width of the first arm 18 of the end yoke 14. Thus, when the tool 12 is installed on the end yoke 14, the side rails 90 and 92 about the sides of the first arm 18. As a result, the tool 12 is prevented from moving in a lateral direction with respect to the end yoke 14 between the side rails 90 and 92.

The distance $D_2$ between the upper contact surfaces 82 and 84 and the lower contact surfaces 86 and 88, respectively, of the tool 12 is slightly smaller than the distance $D_1$ between the inner surfaces 26 and 28 of the first and second arms 18 and 20. Thus, the tool 12 can be positioned between the first and second arms 18 and 20 with substantially no gap between the inner surfaces 26 and 28 thereof and the associated upper and lower contact surfaces 82, 84, 86, and 88. In other words, the first segment 26a of the inner surface 26 is generally in abutting contact with the upper contact surface 84, the second segment 26b of the inner surface 26 is generally in abutting contact with the upper contact surface 82, the first segment 28a of the inner surface 28 is generally in abutting contact with the lower contact surface 88, and the second segment 28b of the inner surface 28 is generally in abutting contact with the lower contact surface 86. The specific relationship between the distances $D_1$ and $D_2$ can be varied as desired.

After the tool 12 has been positioned between the first and second arms 18 and 20, the first bearing cup 42 is pressed downward into the opening 22 of the first arm 18. When the first bearing cup 42 is pressed into the opening 22, the first bearing cup 42 is mounted on the trunnion 38 so that the plurality of needle bearings 58 engage the cylindrical surface of the trunnion 38. When the first bearing cup 42 has been pressed into the opening 22 by a sufficient distance, the snap ring 66 can then be installed in the annular groove 54 of the first bearing cup 42. The first bearing cup 42 can be pressed downward by any suitable method, such as by driving a push rod 96 of a mechanical press downward on top of the first bearing cup 42, as shown in FIG. 3. The diameter of the first bearing cup 42 and the diameter of the opening 22 are sized so that the first bearing cup 42 is frictionally held in place by a press fit suitable. Since the first bearing cup 42 is press fit into the opening 22, a force is exerted on the first arm 18 when the first bearing cup 42 is inserted. The presence of the tool 12 between the first and second arms 18 and 20 prevents either of such arms 18 and 20 from flexing during the installation of the first bearing cup 42. Preferably, the second arm 20 is supported, such as by a fixed member 98, illustrated in phantom lines in FIG. 3, so that the first and second arms 18 and 20 are not deflected in a downward direction with respect to the body portion 16. The second bearing cup 44 can be inserted into the opening 24 of the second arm 20 in a similar manner as described above with respect to the insertion of the first bearing cup 44 into the opening 22 of the first arm 18.

Figure 4:
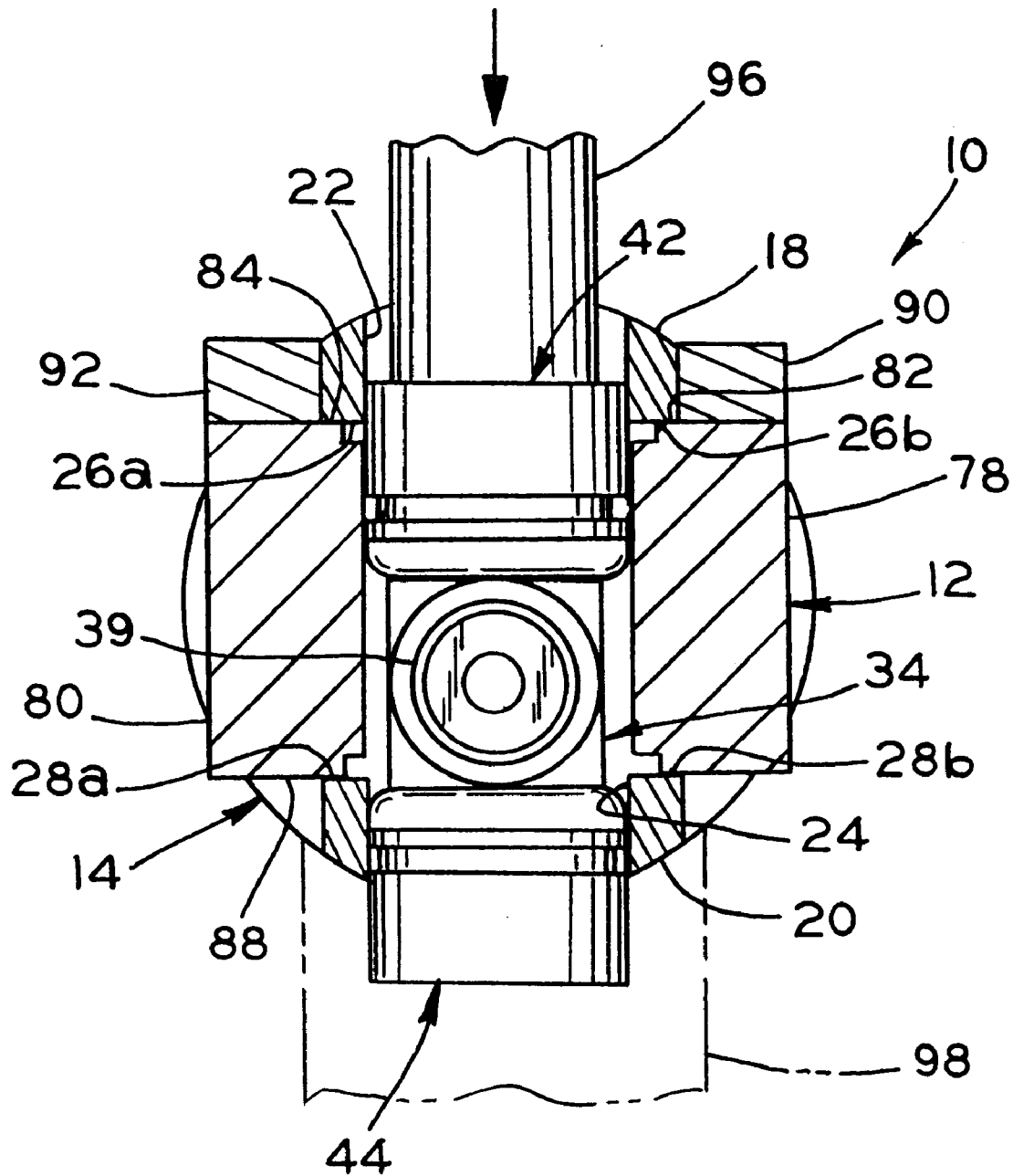
FIG. 4 is a sectional elevational view similar to FIG. 3 showing the removal of one of the bearing cups from the assembled universal joint.

As shown in FIG. 4, the tool 12 can also be used to remove the bearing cups 42 and 44 and the cross 34 from an assembled universal joint 10. To remove the bearing cups 42 and 44, the snap rings 66 and 68 are removed from the associated annular grooves 54 and 56 of the first and second bearing cups 42 and 44, respectively. Next, the tool 12 is positioned between the first and second arms 18 and 20 as described above. The first bearing cup 42 is then pressed through the opening 22 of the first arm 18 in a direction towards the second arm 20, thereby moving the cross 34 in a downward direction as viewing FIG. 4. Movement of the cross 34 causes the second bearing cup 44 to move out of the opening 24 of the second arm 20. The second bearing cup 44 can be pushed all the way out of the opening 24 by the push rod 96 or pushed so that the second bearing cup 44 is partially exposed from out of the opening 24, as shown in FIG. 4. The exposed end of the second bearing cup 44 can then be pulled out from the opening 24, such as by a manual grasping tool. After the second bearing cup 44 has been removed from the trunnion 40, a force is then applied to the end of the trunnion 40 in a direction towards the first arm 18 to move the first bearing cup 42 out of the opening 22. The first bearing cup 42 is then removed from the trunnion 38. The cross 34 can then be removed from between the first and second arms 18 and 20.

Although the inner surfaces 26 and 28 of the first and second arms 18 and 20 are shown co-planar to each other, it is contemplated that the inner surfaces 26 and 28 can be formed at an angle to each other. The tool 12 would then be appropriately formed such that the associated upper and lower contact surfaces 82, 84, 86, and 88 are formed at similar angles. Also, the abutting contact between the contact surfaces 82, 84, 86, and 88 of the tool 12 and the inner surfaces 26 and 28 of the first and second arms 18 and 20 does not have to be a surface to surface contact as illustrated and described above, but can be a line or point contact abutment.

Figure 5:
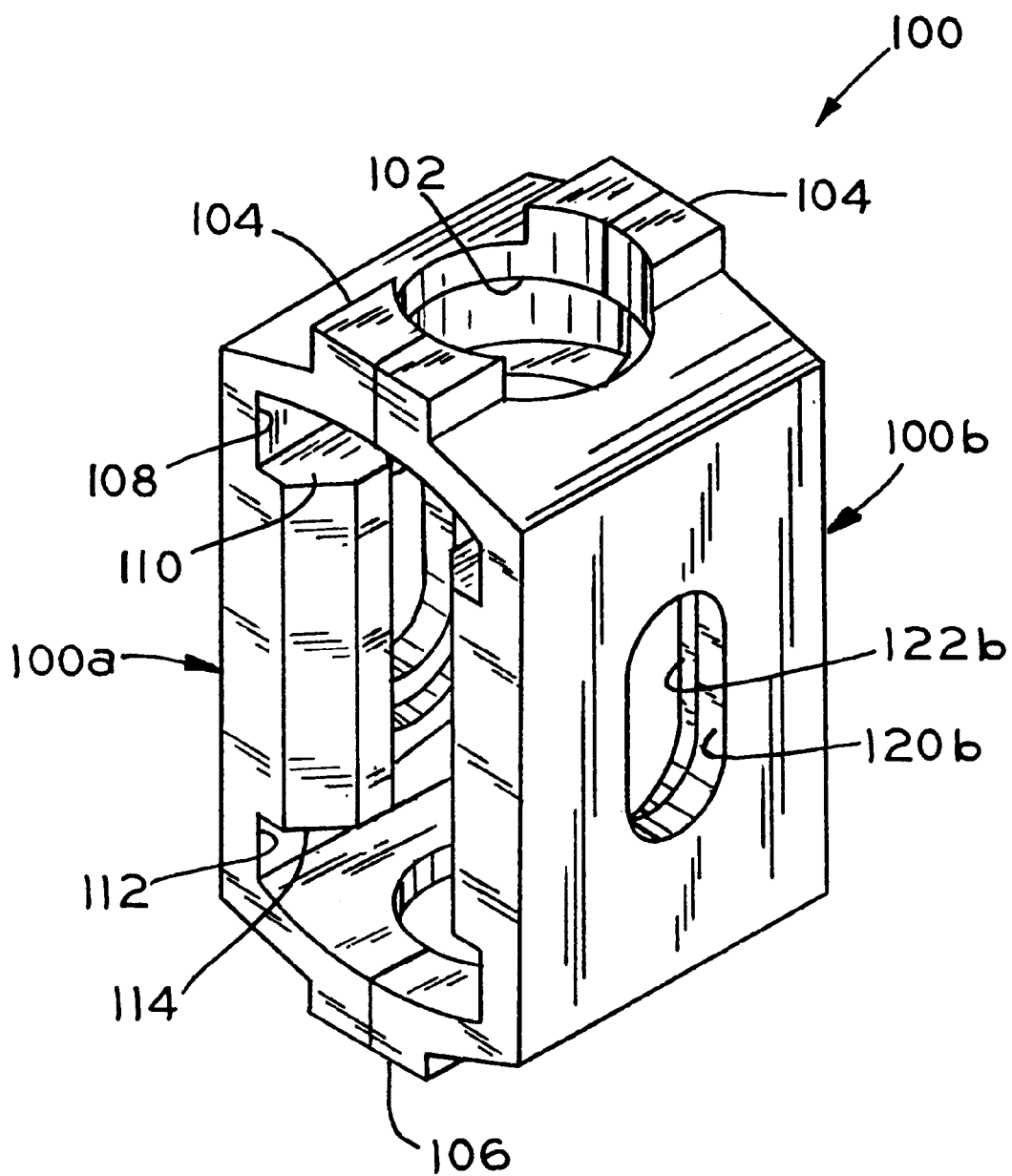
FIG. 5 is a perspective view of a second embodiment of a tool in accordance with this invention.
Figure 6:
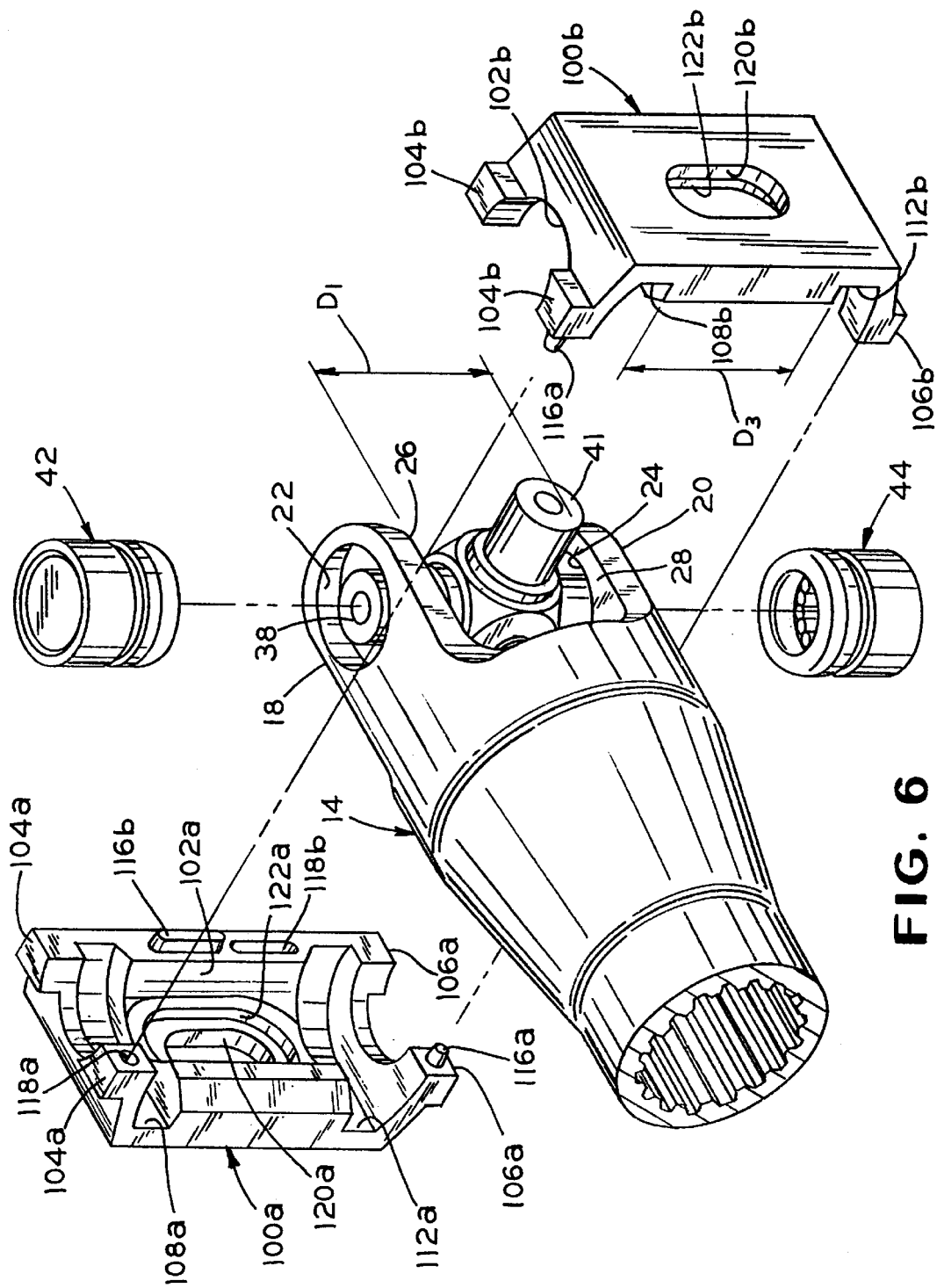
FIG. 6 is an exploded perspective view of a portion of a universal joint and the tool illustrated in FIG. 5.

Referring now to FIGS. 5 through 9, there is illustrated a second embodiment of a tool, indicated generally at 100, in accordance with the present invention. The tool 100 can be made of any suitable material, such as plastic or metal. One material that has been found to function satisfactorily is a high-impact polypropylene polymer, such as manufactured by Montell Polyolefins under the designation Pro-fax SB-786. The tool 100 is composed of a pair of identical tool halves 100a and 100b together. As illustrated in FIG. 6, the tool halves 100a and 100b are fitted over the first and second arms 18 and 20 of the end yoke 14 and are positioned adjacent one another when the tool 100 is used to remove or install a bearing cup 42 or 44 from the universal joint 10. Preferably, the tool halves 100a and 100b are identical in structure, as shown, for ease of manufacture.

As shown in FIGS. 5 and 6, each of the tool halves 100a and 100b has a semi-cylindrical channel 102a and 102b, respectively, formed vertically through the facing sides thereof. The semi-cylindrical channels 102a and 102b define a through bore 102 through the tool 100 when the tool halves 100a and 100b are mated together. Each of the tool halves 100a and 100b includes a pair of upper extensions 104a and 104b, respectively, and a pair of lower extensions 106a and 106b, respectively. The pair of upper extensions 104a and 104b define a pair of upper extensions 104 when the tool halves 100a and 10b are mated together to form the tool 100. The pair of lower extensions 106 and 106b define a pair of lower extensions 106 when the tool halves 100a and 100b are mated combined together to form the tool 100.

Each of the tool halves 100a and 100b has a first arcuate slot 108a and 108b, respectively, formed therein which define a first arcuate slot 108 of the tool 100 when the tool halves 100a and 100b are combined together. Preferably, the cross-sectional shape of the first arcuate slot 108 conforms to the cross-sectional shape of the first arm 18 of the end yoke 14. The first arcuate slot 108 defines a first contact surface 110 for engagement with the inner surface 26 of the first arm 18. Each of the tool halves 100a and 100b also has a second arcuate slot 110a and 110b, respectively, formed therein which define a second arcuate slot 112 of the tool 100 when the tool halves 100a and 100b are combined together. Preferably, the cross-sectional shape of the second arcuate slot 112 conforms to the cross-sectional shape of the second arm 18 of the end yoke 14. The second arcuate slot 112 defines a second contact surface 114 for engagement with the inner surface 28 of the second arm 20. The first and second contact surfaces 110 and 114 are spaced apart by a distance $D_3$ which is approximately to equal or slightly smaller than the distance $D_1$ between the inner surfaces 26 and 28 of the first and second arms 18 and 20.

Preferably, the tool halves 100a and 100b have one or more alignment pins 116a and a plurality of cooperatively facing holes 118a formed in the other one of the tool halves 100a and 100b. As shown in FIG. 6, the alignment pins 116a can be formed having a tapered cross sectional shape (although such is not required), and the holes 118a may be formed in a complementary manner. As also shown in FIG. 6, one or more elongated protrusions 116b and associated elongated openings 118b may be formed in the tool halves 100a and 100b for the same purpose. When the tool halves 100a and 100b are combined to form the tool 100, the alignment pins 116a and protrusions 116b are inserted into the associated holes 118a and openings 118b, thereby correctly positioning the tool halves 100a and 100b with respect to each other. The alignment pins 116a and protrusions 116b and the holes 118a and openings 118b can be formed at any suitable location on the tool halves 100a and 100b.

Each of the tool halves 100a and 100b has an elongated slot 120a and 120b, respectively, formed through the opposed sides thereof. The elongated slots 120a and 120b have a width which is slightly larger than the diameters of the trunnions 39 and 41 to provide clearance therefore. The height of the elongated slots 120a and 120b accommodates vertical movement of the trunnions 39 and 41 when the bearing cups 42 and 44 are installed or removed from the first and second arms 18 and 20 of the end yoke 14. Each of the tool halves 100a and 100b also has elongated stepped recesses 122a and 122b formed in the inner wall of the semi-cylindrical channels 102a and 102b. The stepped recesses 122a and 122b provide clearance for the trunnions 39 and 41 and the central body portion 36 of the cross 34.

Figure 7:
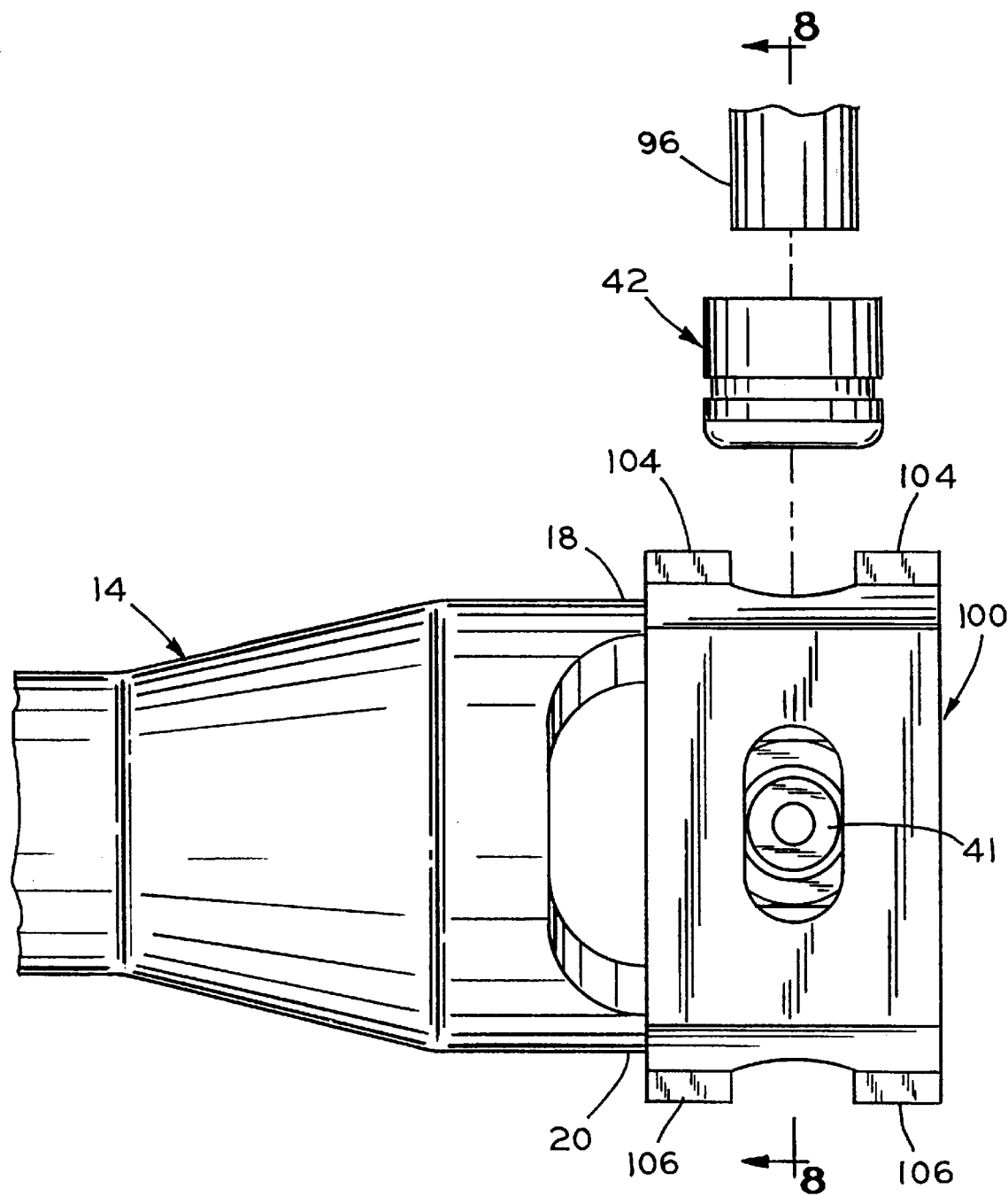
FIG. 7 is a side elevational view of the universal joint illustrated in FIG. 6 showing the tool positioned between the opposed arms of the yoke of the universal joint, prior to insertion of the bearing cup.
Figure 8:
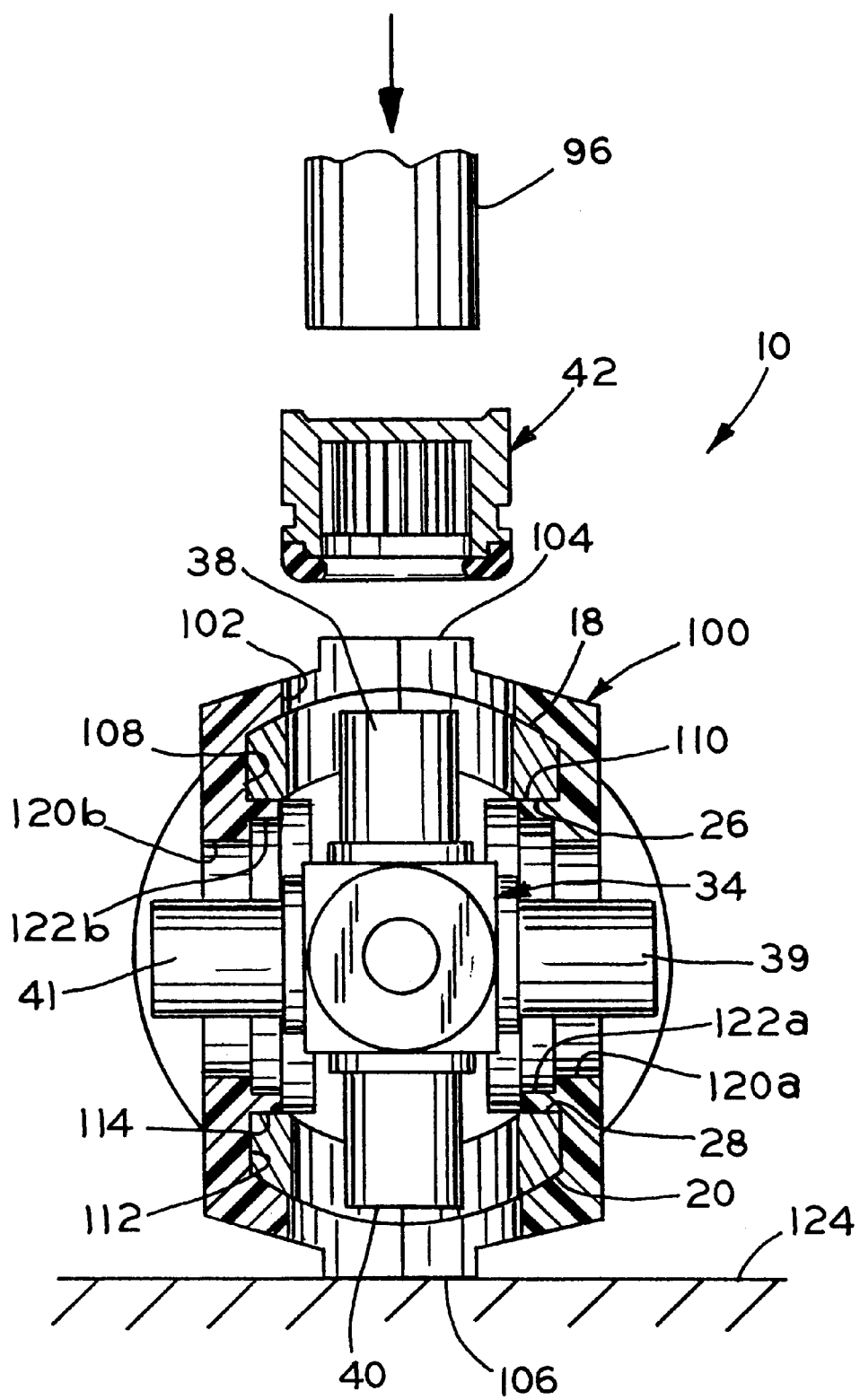
FIG. 8 is a sectional elevational view taken along line 8—8 of FIG. 7.

To install the first bearing cup 42 in the end yoke 14 with the assistance of the tool 100, the cross 34 is first positioned between the first and second arms 18 and 20 so that the trunnions 38 and 40 are generally coaxial with the openings 22 and 24, such as illustrated in FIG. 6. Next, the tool halves 100a and 100b are combined together and placed over the first and second arms 18 and 20 of the yoke 14, as shown in FIGS. 7 and 8. The tool halves 100a and 100b are combined so that the first contact surface 110 of the tool 100 is adjacent the inner surface 26 of the first arm, and the second contact surface 114 of the tool 100 is adjacent the inner surface 28 of the second arm 20. Since the distances $D_1$ and $D_3$ are approximately equal, there is substantially no gap between the inner surfaces 26 and 28 and the first and second contact surfaces 110 and 114, respectively. As mentioned above, the alignment pins 116a and protrusions 116b are inserted into the associated holes 118a and openings 118b to assist in positioning the tool 100a and 100b relative to one another.

After the tool 100 has been properly positioned between the first and second arms 18 and 20, the first bearing cup 42 is pressed downward into the opening 22 of the first arm. When the first bearing cup 42 is pressed into the opening 22, the first bearing cup 42 is mounted on the trunnion 38 so that the plurality of needle bearings 58 engage the cylindrical surface of the trunnion 38. When the first bearing cup 42 has been pressed into the opening 22 by a sufficient distance, the snap ring 66 (FIG. 1) can then be installed in the annular groove 54 of the first bearing cup 42. The tool 100 prevents the first and second arms 18 and 20 from flexing or deflecting in a direction towards one another. Preferably, the lower extension 106 is supported on a fixed surface 124, as shown in FIG. 8, so that the first and second arms 18 and 20 are not deflected in a downward direction with respect to the body portion 16 of the end yoke 14. The second bearing cup 44 can be inserted into the opening 24 of the second arm 20 in a similar manner as described above with respect to the insertion of the first bearing cup 44 into the opening 22 of the first arm 18.

Figure 9:
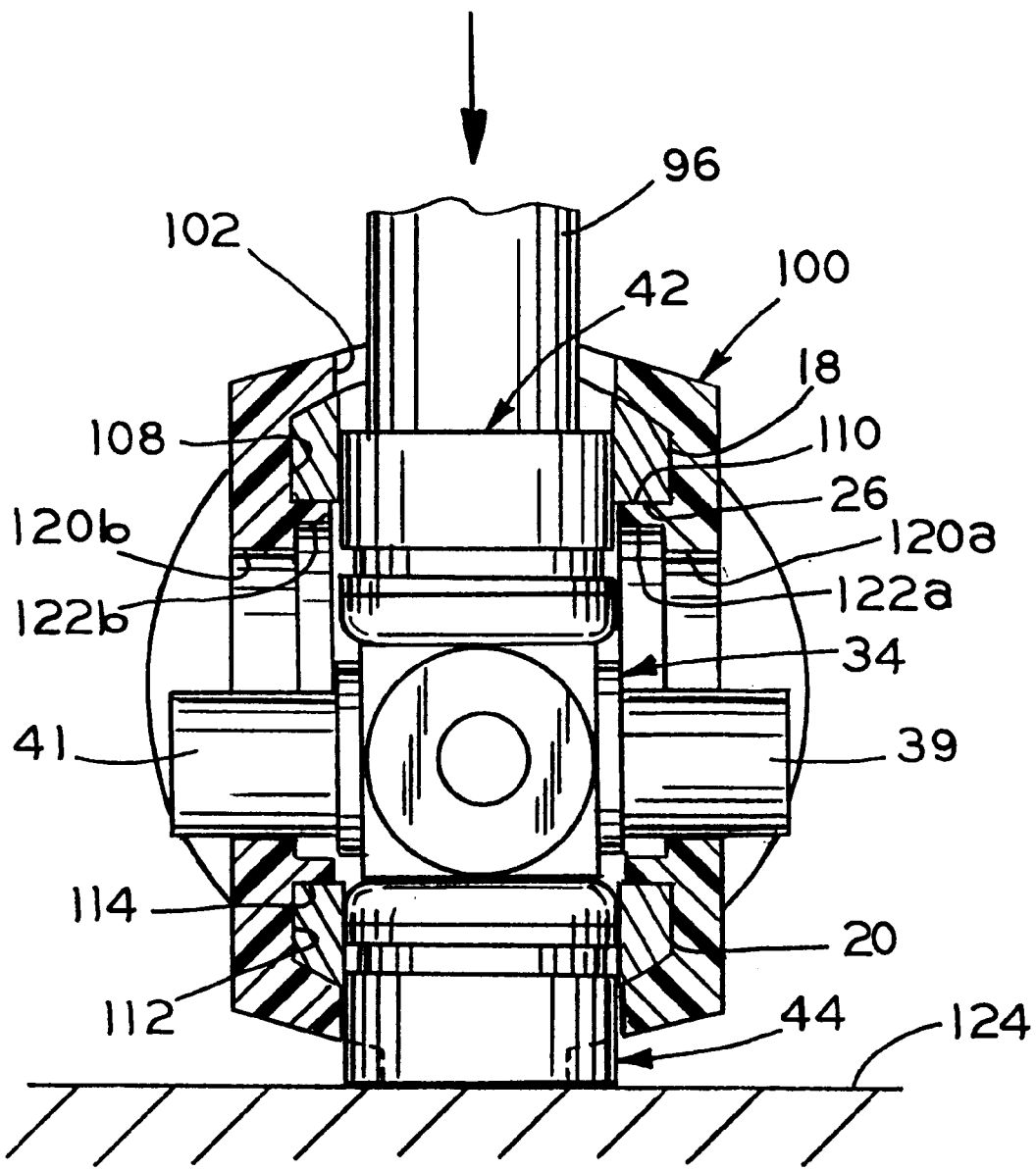
FIG. 9 is a sectional elevational view similar to FIG. 8 showing the removal of one of the bearing cups from the assembled universal joint.

As shown in FIG. 9, the tool 100 can also be used to remove the bearing cups 42 and 44 and the cross 34 from an assembled universal joint 10. To remove the bearing cups 42 and 44, the snap rings 66 and 68 are removed from the associated annular grooves 54 and 56 of the first and second bearing cups 42 and 44, respectively. Next, the tool 100 is positioned between the first and second arms 18 and 20 as described above. Preferably, the tool 100 and the universal joint 10 are supported by positioned the lower extension 106 on the fixed surface 124. The first bearing cup 42 is then pressed through the opening 22 of the first arm 18 in a direction towards the second arm 20, thereby moving the cross 34 in a downward direction as viewing FIG. 4. Movement of the cross 34 causes the second bearing cup 44 to move out of the opening 24 of the second arm 20. The second bearing cup 44 can be pushed through the opening 24 until the second bearing cup 44 bottoms out against the fixed surface 124. Preferably, the height of the lower extension 106 is sized so that the second bearing cup 44 out from the opening 24 by a sufficient distance so that the exposed end of the second bearing cup 44 can be pulled out from the opening 24 by a manual grasping tool. After the second bearing cup 44 has been removed from the trunnion 40, the universal joint 10 and the tool 100 can be flipped over so that the upper extension 104 rests on the fixed surface 124. A force is then applied to the end of the trunnion 40 in a direction towards the first arm 18 to move the first bearing cup 42 out of the opening 22. The first bearing cup 42 is then removed from the trunnion 38. The cross 34 can then be removed from between the first and second arms 18 and 20.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A method for installing a bearing cup on a universal joint including a yoke having a pair of opposed arms extending therefrom, each of the arms having an opening formed therethrough and an inner surface, said method comprising the steps of:

(a) providing a tool having a pair of contact surfaces which are spaced apart from one another by a distance which is approximately equal to the distance between the inner surfaces of the arms;

(b) positioning the tool between the arms so that the contact surfaces of the tool respectively abut the inner surfaces of the arms; and (c) pressing the bearing cup into the opening of one of the arms, wherein the tool prevents the pair of opposed arms from deflecting in a direction towards one another.

2. The method defined in claim 1, wherein the bearing cup is pressed into the opening by a push rod of a mechanical press.

3. The method defined in claim 1 further including a step (d) preceding step (c), said step (d) comprising positioning a cross having a pair of opposed trunnions extending therefrom between the arms such that a first one of the trunnions is aligned with the opening of one of the arms, wherein the pressing of the bearing cup into the opening of the arm mounts the bearing cup on the first trunnion.

4. The method defined in claim 1 further including the step of supporting one of the pair of opposed arms while the bearing cup is pressed into the opening of the other one of the pair of opposed arms so that the pair of opposed arms are not deflected with respect to a body portion of the yoke from which the pair of opposed arms extend.

5. The method defined in claim 1 wherein the tool is positioned between the arms such that the arms are disposed within respective slots formed in the tool, and wherein the slots define the contact surfaces.

6. A method for removing a bearing cup from a universal joint including a cross having first and second trunnions extending therefrom, first and second bearing cups respectively mounted on the first and second trunnions, and a yoke having first and second arms extending therefrom, each of the arms having an opening formed therethrough respectively receiving the first and second bearing cups, each of the arms having an inner surface, said method comprising the steps of:

(a) providing a tool having a pair of contact surfaces which are spaced apart from one another by a distance which is approximately equal to the distance between the inner surfaces of the first and second arms;

(b) positioning the tool between the first and second arms so that the contact surfaces of the tool abut the respective inner surfaces of the arms; and (c) pressing the first bearing cup into the opening of the first arm towards the second arm such that the second bearing cup is moved out of the opening of the second arm, wherein the tool prevents the first and second arms from deflecting in a direction towards one another.

7. The method defined in claim 6 wherein the first bearing cup is moved completely out of the opening of the second arm by a mechanical press.

8. The method defined in claim 6 wherein the first bearing cup is moved out of the opening to a partially exposed position, the method further comprising the step of manually pulling the first bearing cup completely out of the opening.

9. The method defined in claim 6 further comprising the step of applying a force to the second trunnion in a direction towards the first arm so as to push the first bearing cup through the opening of the first arm, thereby moving the first bearing cup out from the opening of the first arm.

10. The method defined in claim 6 further including the step of supporting the second arm while the bearing cup is pressed into the opening of the first arm so that the first and second arms are not deflected with respect to a body portion of the yoke from which the pair of opposed arms extend.

11. The method defined in claim 10 wherein the tool is provided with an extension extending outwardly in a direction away from the second arm, the extension being spaced apart from the opening of the second arm and in contact with a fixed supporting surface which supports the second arm, wherein the second bearing cup is moved out of the opening of the second arm until it contacts the fixed supporting surface.

12. The method defined in claim 6 wherein the tool is positioned between the first and second arms such that the first and second arms are disposed within respective slots formed in the tool, and wherein the slots define the contact surfaces.

13. An apparatus for installing and removing a bearing cup from a universal joint including a yoke having a pair of opposed first and second arms extending therefrom, each of the arms having an inner surface facing one another and an opening formed therein for receiving the bearing cup, said apparatus comprising a body having a bore formed therein having a diameter which is slightly larger than the diameter of the openings of the arms, said body having a pair of slots formed therein for receiving the first and second arms, said slots defining a pair of contact surfaces which are spaced apart from one another by a distance which is approximately equal to the distance between the inner surfaces of the pair of arms.

14. The apparatus defined in claim 13, wherein the tool is comprised of two halves having identical structures.

15. The apparatus defined in claim 13, wherein said slots have a cross-sectional shape which conforms to the cross-sectional shape of the first and second arms of the yoke.

* * * * *